(12) United States Patent
Kim

(10) Patent No.: US 9,837,082 B2
(45) Date of Patent: Dec. 5, 2017

(54) INTERACTIVE SERVER AND METHOD FOR CONTROLLING THE SERVER

(71) Applicant: SAMSUNG ELECTRONICS CO., LTD., Suwon-si (KR)

(72) Inventor: Kyung-duk Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 239 days.

(21) Appl. No.: 14/590,630

(22) Filed: Jan. 6, 2015

(65) Prior Publication Data

US 2015/0235643 A1     Aug. 20, 2015

(30) Foreign Application Priority Data

Feb. 18, 2014   (KR) .................. 10-2014-0018240

(51) Int. Cl.
| | | |
|---|---|---|
| *G10L 15/00* | (2013.01) | |
| *G10L 17/22* | (2013.01) | |
| *G10L 15/197* | (2013.01) | |
| *G06F 17/27* | (2006.01) | |
| *H04N 21/233* | (2011.01) | |
| *H04N 21/422* | (2011.01) | |
| *H04N 21/47* | (2011.01) | |
| *H04N 21/658* | (2011.01) | |

(52) U.S. Cl.
CPC .............. *G10L 17/22* (2013.01); *G06F 17/27* (2013.01); *G10L 15/197* (2013.01); *H04N 21/233* (2013.01); *H04N 21/42203* (2013.01); *H04N 21/47* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 6,721,706 B1 | 4/2004 | Strubbe et al. | |
| 7,873,519 B2 | 1/2011 | Bennett | |

(Continued)

FOREIGN PATENT DOCUMENTS

| | | |
|---|---|---|
| EP | 1494129 A1 | 1/2005 |
| JP | 2006-201870 A | 8/2006 |

(Continued)

OTHER PUBLICATIONS

Written Opinion dated May 21, 2015, issued by the International Searching Authority in counterpart International Application No. PCT/KR2015/001420.

(Continued)

*Primary Examiner* — Kevin Ky
(74) *Attorney, Agent, or Firm* — Sughrue Mion, PLLC

(57) ABSTRACT

An interactive server and a controlling method thereof are provided. The method of controlling an interactive server includes receiving data corresponding to a user voice from a user terminal, determining an utterance type of the user voice, in response to determining that the utterance type of the user voice is an integrated utterance type, generating a search response and a chatting response in response to the user voice and generating an integrated response by combining the generated search response and the generated chatting response, and transmitting the generated integrated response to the user terminal.

16 Claims, 9 Drawing Sheets

(56) References Cited

U.S. PATENT DOCUMENTS

| | | | |
|---|---|---|---|
| 2004/0068406 A1 | 4/2004 | Maekawa et al. | |
| 2008/0010070 A1 | 1/2008 | Kim et al. | |
| 2010/0049513 A1 | 2/2010 | Huang et al. | |
| 2011/0153322 A1 | 6/2011 | Kwak et al. | |
| 2013/0268260 A1* | 10/2013 | Lundberg | G06F 17/28 704/8 |
| 2013/0275164 A1* | 10/2013 | Gruber | G10L 17/22 705/5 |
| 2014/0310001 A1* | 10/2014 | Kalns | G06Q 30/06 704/270.1 |
| 2014/0316764 A1* | 10/2014 | Ayan | H04M 3/4936 704/9 |
| 2015/0058014 A1 | 2/2015 | Lee et al. | |
| 2015/0199967 A1* | 7/2015 | Reddy | G10L 25/30 704/249 |

FOREIGN PATENT DOCUMENTS

| | | |
|---|---|---|
| JP | 2009-198614 A | 9/2009 |
| KR | 10-0772660 B1 | 11/2007 |
| KR | 10-0807307 B1 | 2/2008 |
| KR | 10-2011-0072847 A | 6/2011 |
| WO | 2013/172534 A1 | 11/2013 |

OTHER PUBLICATIONS

Search Report dated May 21, 2015, issued by the International Searching Authority in counterpart International Application No. PCT/KR2015/001420.

* cited by examiner

INTERACTIVE SERVER AND METHOD FOR CONTROLLING THE SERVER

CROSS-REFERENCE TO RELATED APPLICATION(S)

This application claims priority from Korean Patent Application No. 10-2014-0018240, filed in the Korean Intellectual Property Office on Feb. 18, 2014, the disclosure of which is incorporated herein by reference.

BACKGROUND

1. Field

Apparatuses and methods consistent with exemplary embodiments relate to an interactive server and a method for controlling the interactive server, and more particularly, to an interactive server which provides a combined response by combining a search response and a chatting response in response to an input user voice, and a method for controlling the interactive server.

2. Description of the Related Art

Recently, an interactive system which provides a response to a user voice actively is provided. Specifically, if a user terminal recognizes a user voice and transmits the recognized user voice to an external interactive server, the interactive server determines the type of utterance of the user voice, generates a response according to the utterance type, and transmits the response to the user terminal.

For instance, if a user voice, "please recommend a scary movie", is input, the interactive server may determine that the utterance type of the user voice is a search utterance type and transmit a search response, "17 scary movies are found", to the user terminal in response to the user voice. In another example, if a user voice, "I am hungry", is input, the interactive server may determine that the utterance type of the user voice is a chatting utterance type and transmit a search response, "I am on a diet, too", to the user terminal in response to the user voice.

That is, the related art interactive system outputs only one of a search response and a chatting response with respect to a user voice. However, there may be cases where it is difficult to determine whether a user voice is a search utterance type or a chatting utterance type. In this case, a search response may be output in response to some user utterances having similar meanings and a chatting response may be output in response to others, providing inconsistency in user experience.

SUMMARY

One or more exemplary embodiments relate to an interactive server capable of providing a response combining a search response and a chatting response when it is difficult to determine the utterance type of a user voice, and a controlling method thereof.

According to an aspect of an exemplary embodiment, there is provided a method of controlling an interactive server including receiving data corresponding to a user voice, determining an utterance type of the user voice, in response to determining that the utterance type of the user voice is an integrated utterance type, generating a search response and a chatting response in response to the user voice and generating an integrated response by combining the generated search response and the generated chatting response, and transmitting the generated integrated response to the user terminal.

The determining the utterance type of the user voice may include calculating a probability of the utterance type of the user voice being a search utterance type using a search language model established based on search utterances and calculating a probability of the utterance type of the user voice being a chatting utterance type using a chatting language model established based on chatting utterances, calculating a disparity value between the probability of the utterance type of the user voice being the search utterance type and the probability of the utterance type of the user voice being the chatting utterance type, and in response the disparity value being less than a predetermined value, determining that the utterance type of the user voice is the integrated utterance type.

The determining the utterance type of the user voice may further include, in response to the disparity value exceeding a predetermined value, when the probability of the utterance type of the user voice being a search utterance type is greater than the probability of the user voice being a chatting utterance type, determining that the user voice is a search utterance type, and when the probability of the utterance type of the user voice being a search utterance type is less than the probability of the user voice being a chatting utterance type, determining that the user voice is a chatting utterance type.

The method may include, in response to determining that the utterance type of the user voice is the search utterance type, generating a search response to the user voice, and in response to determining that the utterance type of the user voice is a chatting utterance type, generating a chatting response to the user voice, and transmitting one of the search response and chatting response which are generated in response to the user voice to the user terminal.

The generating may include generating a search response and a chatting response in response to the user voice, determining whether it is possible to combine the search response and the chatting response by determining a sentence type of the search response and the chatting response and whether common information is included, when it is possible to combine the search response and the chatting response, determining combination order of the search response and the chatting response, in order to combine the search response with the chatting response, modifying at least one of the search response and the chatting response, and combining the modified search response and chatting response according to the determined combination order.

The method may include, when it is impossible to combine the search response with the chatting response, transmitting one of the search response and the chatting response.

The determining combination order may include determining combination order of the search response and the chatting response by comparing a probability of the utterance type of the user voice being a chatting utterance type with a probability of the utterance type of the user voice being a search utterance type.

The modifying may include modifying an ending of at least one of the search response and the chatting response.

According to an aspect of another exemplary embodiment, there is provided an interactive server including an input unit configured to receive data corresponding to a user voice from a user terminal, a determiner configured to, in response to a user voice being input through the input unit, determine an utterance type of the user voice, a response generator configured to, in response to determining that the utterance type of the user voice is an integrated utterance type, generate a search response and a chatting response in response to the user voice, and generate an integrated response by combining the generated search response and the generated chatting response, and a transmitter configured to transmit the generated integrated response to a user terminal.

The determiner may include a probability calculator configured to calculate a probability of the utterance type of the user voice being a search utterance type using a search language model established based on search utterances, and calculate a probability of the utterance type of the user voice being a chatting utterance type using a chatting language model established based on chatting utterances, a disparity calculator configured to calculate a disparity value between the probability of the utterance type of the user voice being a search utterance type and the probability of the utterance type of the user voice being a chatting utterance type, and an utterance type determiner configured to, in response to the disparity value being less than a predetermined value, determine that the user voice is the integrated utterance type.

The utterance type determiner, in response to the disparity value exceeding a predetermined value, when the probability of the utterance type of the user voice being a search utterance type is greater than the probability of the utterance type of the user voice being a chatting utterance type, may determine that the utterance type of the user voice is a search utterance type, and when the probability of the utterance type of the user voice being a search utterance type is less than the probability of the utterance type of the user voice being a chatting utterance type, may determine that the utterance type of the user voice is a chatting utterance type.

The response generator, in response to determining that the utterance type of the user voice is a search utterance type, may generate a search response to the user voice, and in response to determining that the utterance type of the user voice is a chatting utterance type, may generate a chatting response to the user voice. The transmitter may transmit one of the search response and chatting response which are generated in response to the user voice to the user terminal.

The response generator may include a search response generator configured to generate a search response to the user voice, a chatting response generator configured to generate a chatting response to the user voice, a combination determiner configured to determine whether it is possible to combine the search response with the chatting response by determining a sentence type of the search response and the chatting response and whether common information is included in the search response and the chatting response, a combination order determiner configured to, when it is possible to combine the search response and the chatting response, determine combination order of the search response and the chatting response, a response modifier configured to, in order to combine the search response with the chatting response, modify at least one of the search response and the chatting response, and a response combiner configured to combine the modified search response and chatting response according to the determined combination order.

The transmitter, when it is impossible to combine the search response with the chatting response, may transmit one of the search response and the chatting response.

The combination order determiner may determine combination order of the search response and the chatting response by comparing a probability of the utterance type of the user voice being a chatting utterance type with a probability of the utterance type of the user voice being a search utterance type.

The response modifier may modify an ending of at least one of the search response and the chatting response.

According to an aspect of another exemplary embodiment, there is provided a method of controlling an interactive server including receiving a user voice, generating a search response and a chatting response in response to the user voice, determining an utterance type of the user voice, in response to determining the utterance type of the user voice being an integrated utterance type, generating an integrated response by combining the generated search response and the generated chatting response, and transmitting the generated integrated response to a user terminal.

An interactive server according to an exemplary embodiment includes an input unit configured to receive a user voice from a user terminal, a response generator configured to generate a search response and a chatting response in response to the user voice, a determiner configured to determine an utterance type of the user voice, an integrated response generator configured to, in response to determining that the utterance type of the user voice is an integrated utterance type, generate an integrated response by combining the generated search response with the generated chatting response, and a transmitter configured to transmit the generated integrated response to a user terminal.

BRIEF DESCRIPTION OF THE DRAWINGS

The above and/or other aspects will be more apparent by describing certain exemplary embodiments of with reference to the accompanying drawings, in which.

DETAILED DESCRIPTION

Figure 1:
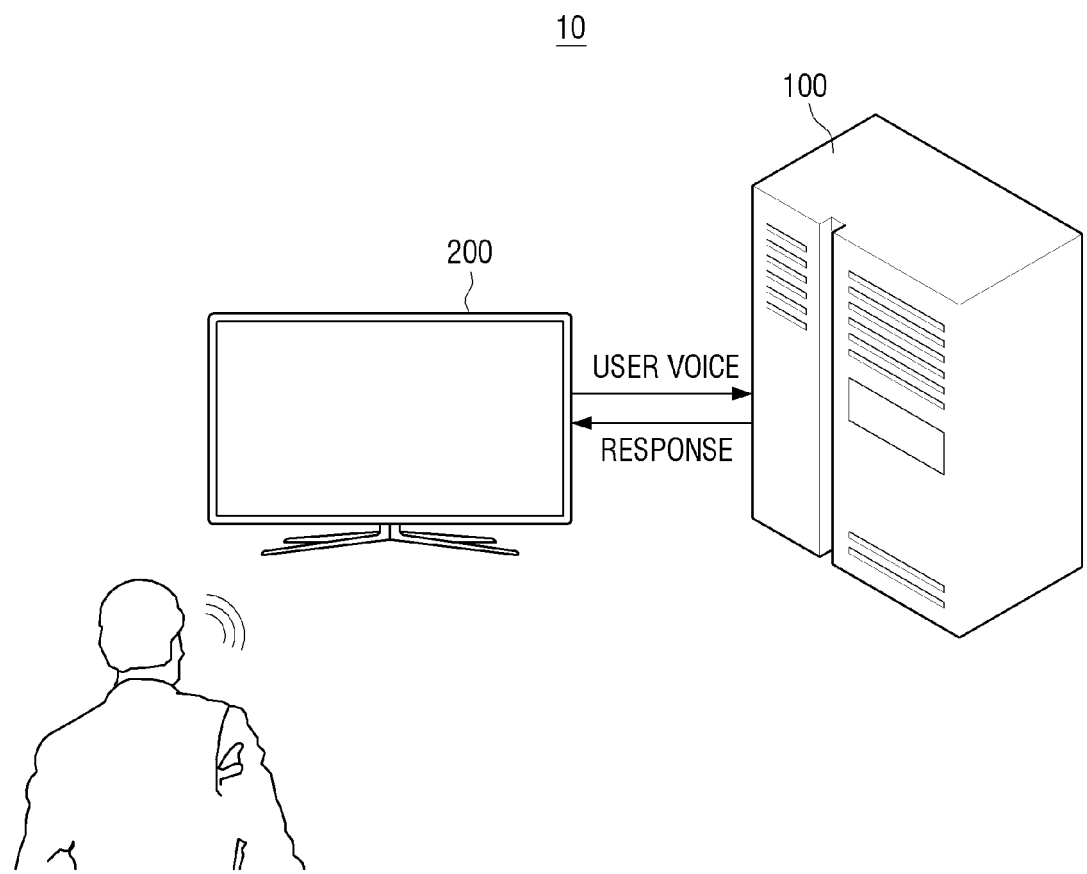
FIG. 1 is a view illustrating an interactive system according to an exemplary embodiment.

In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor (not shown) except for 'modules' or 'units' that should be realized in a specific hardware.

The above features and/or other aspects and advantages will become apparent and more readily appreciated from the following description of the embodiments taken in conjunction with the accompanying drawings in which:

FIG. 1 is a view illustrating an interactive system according to an exemplary embodiment. As illustrated in FIG. 1, an interactive system 10 includes an interactive server 100 and a user terminal 200. In this case, the user terminal 200 may be realized as a smart television as illustrated in FIG. 1, but this is only an example. The user terminal 200 may be realized as various mobile or fixed user terminals such as a smart phone, a tablet personal computer (PC), a notebook PC, a desktop PC, etc.

The user terminal 200 receives a user voice that is input. Subsequently, the user terminal 200 performs voice recognition with respect to the input user voice and obtains corresponding text data of the user voice. In this case, the user terminal 200 may perform voice recognition with respect to a user voice which is input directly, but this is only an example. The user terminal 200 may perform voice recognition using an external server. Specifically, the user terminal 200 may transmit voice data corresponding to an input user voice to an external voice recognition server that generates text data by performing voice recognition with respect to the input voice data and transmits the text data to the user terminal 200. In addition, according to another exemplary embodiment, the user terminal 200 may transmit voice data corresponding to a user voice to the interactive server 100, and perform voice recognition directly.

The user terminal 200 transmits text data corresponding to the input user voice to the interactive server 100.

The interactive server 100 determines the utterance type of a user voice using text data corresponding to the input user voice. In this case, the utterance type of a user voice may include a search utterance type, a chatting utterance type, and an integrated utterance type.

Specifically, the interactive server 100 may calculate the probability of a user voice being a search utterance type using a search language model which is established based on search utterances, and calculate the probability of the user voice being a chatting a chatting utterance type using a chatting language model which is established based on chatting utterances. Subsequently, the interactive server 100 calculates a disparity value between the probability of the user voice being a search utterance type and the probability of the user voice being a chatting utterance type. If the disparity value is less than a predetermined value, that is, if it is difficult to determine whether the user voice is a search utterance type or a chatting utterance type, the interactive server 100 may determine that the user voice is an integrated utterance type. However, if the disparity value exceeds the predetermined value, and the probability that the user voice is a search utterance type is greater than the probability that the user voice is a chatting utterance type, the interactive server 100 may determine that the user voice is a search utterance type, and if the probability that the user voice is a search utterance type is less than the probability that the user voice is a chatting utterance type, the interactive server 100 may determine that the user voice is a chatting utterance type.

If it is determined that the utterance type of a user voice is a search utterance type, the interactive server 100 generates a search response to the user voice, and if it is determined that the utterance type of the user is a chatting utterance type, the interactive server 100 may generate a chatting response to the user voice. The interactive server 100 may transmit one of the generated search response and chatting response to the user terminal 200.

Alternatively, if it is determined that the utterance type of the user voice is an integrated utterance type, the interactive server 100 may generate a search response and a chatting response to the user voice, and generate an integrated response by combining the generated search response and chatting response.

Specifically, if it is determined that the utterance type of the user voice is an integrated utterance type, the interactive server 100 may generate both a search response and a chatting response to the user voice. Subsequently, the interactive server 100 may determine whether it is possible to combine the search response and the chatting response by determining the sentence type of the search response and the chatting response and whether common information is included. For example, if both the search response and the chatting response are declarative sentences, the interactive server 100 may determine that it is impossible to combine the two responses. If it is possible to combine the search response and the chatting response, the interactive server 100 may determine an order of combination of the search response and the chatting response, and may modify at least one of the search response and the chatting response in order to combine the two responses. Subsequently, the interactive server 100 may generate an integrated response by combining the modified search response and chatting response according to the determined order. The interactive server 100 may transmit the generated integrated response to the user terminal 200.

The user terminal 200 may output one of the search response, the chatting response, and the integrated response to the user voice transmitted from the interactive server 100.

According to the above-described interactive system 10, if the utterance type of a user voice is vague, an integrated response which combines a search response and a chatting response is provided, so a user may be provided with a consistent interactive service.

In the above exemplary embodiment, the interactive server 100 determines the utterance type of a user voice and then, generates a response corresponding to the utterance, but this is only an example. The interactive server 100 may generate both a search response and a chatting response to a user command, determine the utterance type and then, transmit a response to the user voice based on the determined utterance type to the user terminal 200.

Figure 2:
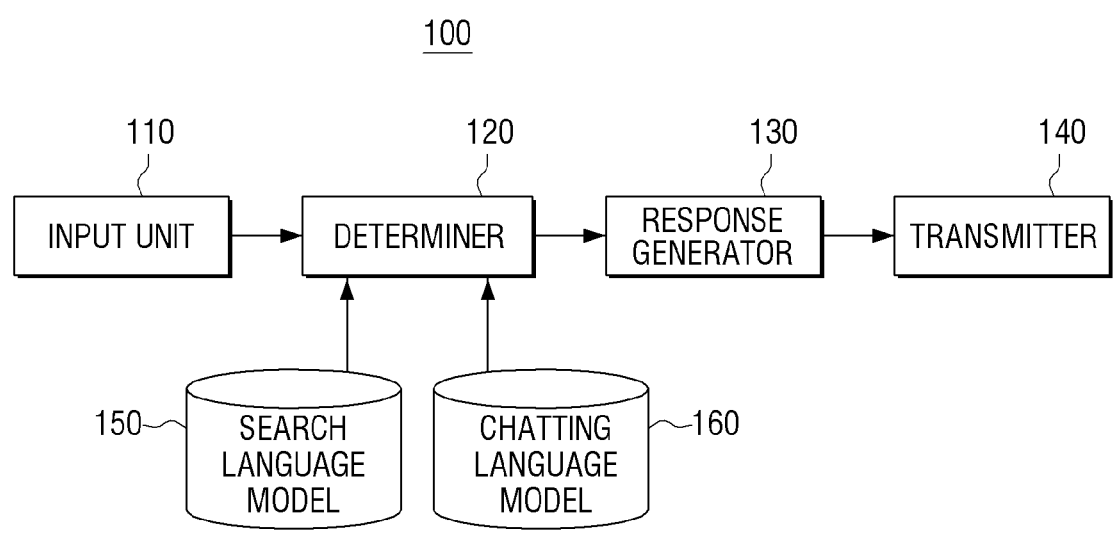
FIG. 2 is a block diagram illustrating configuration of an interactive server according to an exemplary embodiment.
Figure 3:
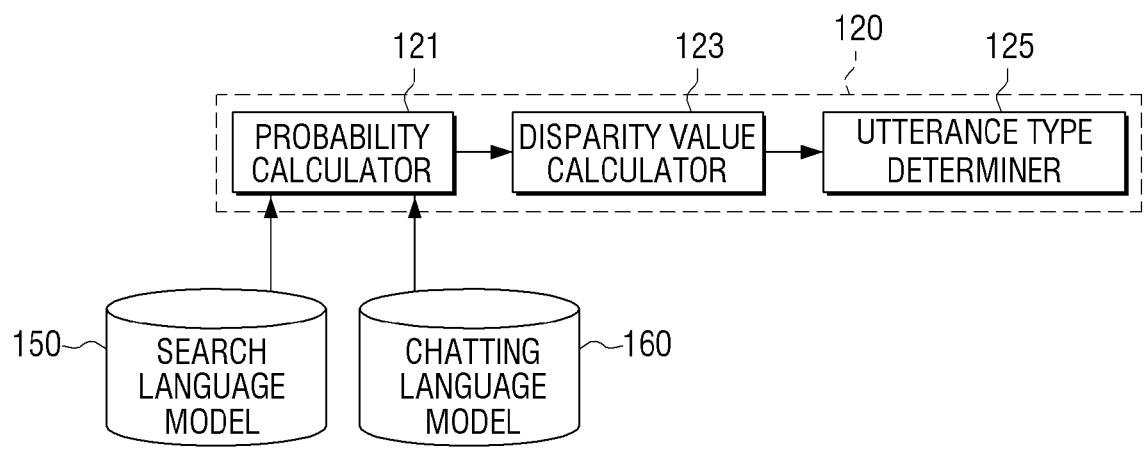
FIG. 3 is a block diagram illustrating configuration of a determiner of FIG. 2 according to an exemplary embodiment.
Figure 4:
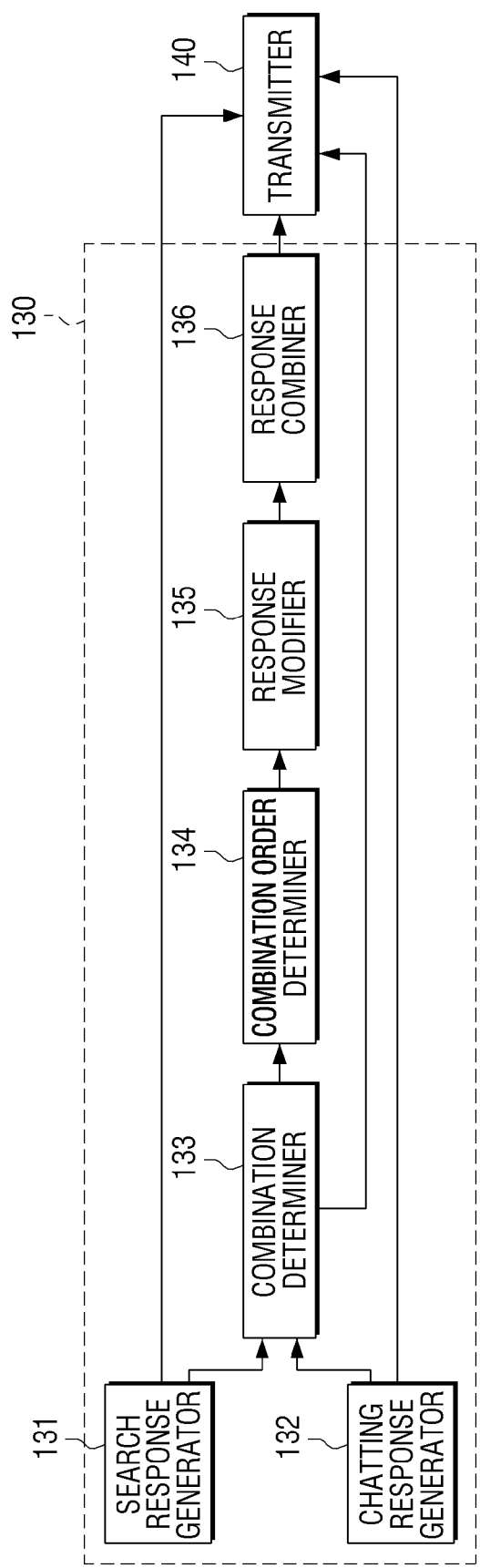
FIG. 4 is a block diagram illustrating configuration of a voice generator of FIG. 2 according to an exemplary embodiment.

Hereinafter, the interactive server 100 will be described in greater detail with reference to FIGS. 2 to 4. FIG. 2 is a block diagram illustrating configuration of the interactive server 100 according to an exemplary embodiment. As illustrated in FIG. 2, the interactive server 100 includes an input unit 110, a determiner 120, a response generator 130, a transmitter 140, a search language model 150, and a chatting language model 160.

The input unit 110 receives a user voice from the user terminal 200. In this case, the input unit 110 may receive a user voice in the form of text data, but this is only an example. The input unit 110 may receive a user voice in the form of voice data. If a user voice in the form of voice data is input, the input unit 110 may extract text data by performing voice recognition with respect to the user voice.

The determiner 120 determines the utterance type of a user voice using the search language model 150 and the chatting language model 160. In this case, the search language model 150 is generated by using a corpus consisting of collected search utterances, and the chatting language model 160 is generated by using a corpus consisting of collected chatting utterances.

For example, if user voices, "which scary movie are we going to watch?" and "a nearby restaurant which serves delicious food", are input, the determiner 120 may determine that the user voice is a search utterance type, and if user voices, "do I look pretty?" and "I feel blue", are input, the determiner 120 may determine that the user voice is a chatting utterance type. Alternatively, if user voices, "I like scary movies" or "the weather is nice, today", are input, the determiner 120 may determine that the user voice is an integrated utterance type.

The detailed methods of the determiner 120 determining the utterance type of a user voice will be described with reference to FIG. 3. Specifically, the determiner 120 may include a probability calculator 121, a disparity value calculator 120, and an utterance type determiner 125.

The probability calculator 121 may calculate the probability ($L_A(S)$) of a user voice being a search utterance type using the search language model 150, and may calculate the probability ($L_B(S)$) of a user voice being a chatting utterance type using the chatting language model 160. In this case, the probability ($L_A(S)$) of a user voice being a search utterance type refers to the probability where text data corresponding to the user voice exists in the search language model 150, and the probability ($L_B(S)$) of a user voice being a chatting utterance type refers to the probability where text data corresponding to the user voice exists in the chatting language model 160.

The disparity value calculator 123 may calculate the disparity value between the probability ($L_A(S)$) of a user voice being a search utterance type and the probability ($L_B(S)$) of a user voice being a chatting utterance type using the following equation 1.

$$f(s)=|L_A(S)-L_B(S)| \quad \text{[Equation 1]}$$

The utterance type determiner 125 may determine the utterance type of a user voice using the probability ($L_A(S)$) of a user voice being a search utterance type, the probability ($L_B(S)$) of a user voice being a chatting utterance type, and the disparity value between the two probabilities. In this case, the utterance type may include a search utterance type, a chatting utterance type, and an integrated utterance type. The integrated utterance type provides an integrated response by combining a chatting response and a search response when it is difficult to determine whether a user voice is a chatting utterance type or a search utterance type.

First of all, the utterance type determiner 125 may determine the disparity value between the probability of a user voice being a search utterance type and the probability of a user voice being a chatting utterance type by comparing the disparity value with a predetermined value (θ) as shown in the following equation 2.

$$f(s)\leq\theta: \text{integrated utterance type}$$

$$f(S)>\theta: \text{search utterance type or chatting utterance type} \quad \text{[Equation 2]}$$

That is, if the disparity value is less than the predetermined value (θ), the utterance type determiner 125 may determine that a user voice is an integrated utterance type, and if the disparity value exceeds the predetermined value (θ), the utterance type determiner 125 may determine that a user voice is a chatting utterance type or a search utterance type.

In particular, as shown in the following equation 3, if the disparity value exceeds the predetermined value (θ), and the probability ($L_A(S)$) of a user voice being a search utterance type is greater than the probability ($L_B(S)$) of a user voice being a chatting utterance type, the utterance type determiner 125 may determine that the user voice is a search utterance type, and if the probability ($L_A(S)$) of a user voice being a search utterance type is smaller than the probability ($L_B(S)$) of a user voice being a chatting utterance type, the utterance type determiner 125 may determine that the user voice is a chatting utterance type.

$$L_A(S)>L_B(S): \text{search utterance type}$$

$$L_A(S)<L_B(S): \text{chatting utterance type} \quad \text{[Equation 3]}$$

The predetermined value (θ) may be set by a system developer arbitrarily, but this is only an example. The predetermined value (θ) may be calculated based on a test sentence. In order to set the predetermined value (θ) based on a test sentence, a classifier which does not classify vague sentences and classifies sentences based solely on information search utterance and chatting utterance may be set up. In this case, when (1) f(S) greater than or equal to 0, the classifier may classify a sentence as information search utterance, and when (2) f(S) less than 0, the classifier may classify a sentence as chatting utterance. N test sentences are input to the utterance type classifier and the language model score of test sentences where a classification error in utterance type occurs is collected. The predetermined value (θ) may be calculated by calculating the mean value (m) and the stand deviation (σ) of f(S) of the sentences where the error occurs.

Referring back to FIG. 2, the determiner 120 may output information regarding the determined utterance type of a user voice to the response generator 130.

The response generator 130 may generate and output at least one of a search response, a chatting response, and an integrated response according to the determined utterance type of a user voice. Specifically, if it is determined that a user voice is a search utterance type, the response generator 130 may generate a search response to the user voice. If it is determined that a user voice is a chatting utterance type, the response generator 130 may generate a chatting response to the user voice. If it is determined that a user voice is an integrated utterance type, the response generator 130 may generate an integrated response to the user voice.

Hereinafter, the response generator 130 will be described in greater detail with reference to FIG. 4. As illustrated in FIG. 4, the response generator 130 includes a search response generator 131, a chatting response generator 132, a combination determiner 133, a combination order determiner 134, a response modifier 135, and a response combiner 136.

If it is determined that a user voice is a search utterance type or an integrated utterance type, the search response generator 131 may generate a search response to the user voice. For example, If a user voice, "which scary movie are we going to watch?" in a search utterance type, is input, the search response generator 131 may generate a search response, "10 recommended scary movies are found", in response to the user voice, and if a user voice, "the weather is nice, today" in an integrated utterance type, is input, the search response generator 131 may generate a search response, "The weather is clear, today, and the afternoon high will be 25° C."

In particular, if a user voice is a search utterance type, the search response generator 131 may output a generated search response directly to the transmitter 140, but if a user voice is an integrated utterance type, the search response generator 131 may output a generated search response to the combination determiner 133.

If it is determined that a user voice is a chatting utterance type or an integrated utterance type, the chatting response generator 132 may generate a chatting response to the user voice. For example, if a user voice in a chatting utterance type, "am I pretty", is input, the chatting response generator 132 may generate a chatting response, "you look really pretty", in response to the user voice. Alternatively, if a user voice in an integrated utterance type, "the weather is great, today", is input, the chatting response generator 132 may generate a chatting response, "the weather is really nice, today".

In particular, if a user voice is a chatting utterance type, the chatting response generator 132 may output a generated search response directly to the transmitter 140, but if a user voice is an integrated utterance type, the chatting response generator 132 may output a generated chatting response to the combination determiner 133.

The combination determiner 133 may determine whether it is possible to combining a search response and a chatting response output from the search response generator 131 and the chatting response generator 132, respectively. Specifically, the combination determiner 133 may determine whether it is possible to combine responses based on the sentence type of a search response and a chatting response, whether common information is included, whether a search response and a chatting response are generated, etc. For example, if a user voice in an integrated utterance type, "what is your name", is input, the search response generator 131 may generate a search response, "the program currently broadcast is "Infinite Challenge", and the chatting response generator 132 may generate a chatting response, "my name is smart TV." In this case, both of the generated search response and the chatting response are declarative sentences and there is no common information and thus, the combination determiner 133 may determine that it is impossible to combine the responses. In another example, if one of a search response and a chatting response is not generated although a user voice is an integrated utterance type, the combination determiner 133 may determine that it is impossible to combine a search response and a chatting response.

If it is determined that combination of the search and chatting responses is not possible, the combination determiner 133 may output one of the generated search response and the generated chatting response to the transmitter 140. For example, if a user voice in an integrated utterance type, "what is your name", is input, the combination determiner 133 may determine that it is impossible to combine a search response and a chatting response, and may output only the chatting response, "my name is smart TV", to the transmitter 140.

If it is determined that combination is possible, the combination determiner 133 may output the generated search response and the generated chatting response to the combination order determiner 134.

The combination order determiner 134 may determine the combination order of a search response and a chatting response. In this case, the combination order determiner 134 may determine the combination order of a search response and a chatting response by comparing the probability of a user voice being a chatting utterance type with the probability of the user voice being a search utterance type. That is, if the probability of a user voice being a chatting utterance type is greater than the probability of the user voice being a search utterance type, the combination order determiner 134 may place the chatting utterance type ahead of the search utterance type, and if the probability of a user voice being a search utterance type is greater than the probability of the user voice being a chatting utterance type, the combination order determiner 134 may place the search utterance type ahead of the chatting utterance type. For example, if a user voice in an integrated utterance type, "I like scary movies", is input, the search response generator 131 may generate may generate a search response, "a total of 10 scary movies are found", and the chatting response generator 132 may generate a chatting response, "I like scary movies, too." In this case, if the probability of a user voice being a chatting utterance type is greater than the probability of the user voice being a search utterance type, the combination order determiner 134 may determine the combination order such that the chatting response comes before the search response.

However, determining the combination order by comparing probabilities as described above is only an example, and one of a chatting response and a search response may be placed first according to a user setting.

The response modifier 135 may modify one of a search response and a chatting response such that it becomes possible to combine the search response and the chatting response. In particular, the response modifier 135 may modify the ending of at least one of a search response and a chatting response. For example, if a user voice in an integrated utterance type, "I like scary movies", is input, the search response generator 131 may generate a search response, "a total of 10 scary movies are found", and the chatting response generator 132 may generate a chatting response, "I like scary movies, too." In this case, the response modifier 135 may change the ending of the search response so that the endings of the chatting response and the search response can be consistent with each other. In another example, the response modifier 135 may put a conjunction between a chatting response and a search response.

The response combiner 136 may generate an integrated response by combining the chatting response and the search response which are modified according to the combination order determined by the combination order determiner 134. For example, if a user voice in an integrated utterance type, "I like scary movies", is input, the search response generator 131 may generate a search response, "a total of 10 scary movies are found", and the chatting response generator 132 may generate a chatting response, "I like scary movies, too." Subsequently, the combination order determiner 134 may determine the combination order such that the chatting response comes before the search response and modify the ending of the search response. Accordingly, the response combiner 136 may generate an integrated response, "I like scary movies, too. A total of 10 scary movies are found", in response to the user voice.

Referring back to FIG. 2, the response generator 130 outputs a generated response to the transmitter 140.

The transmitter 140 transmits the generated response to the user terminal 200 again.

The input unit 110 and the transmitter 140 may transmit/receive a user voice and a generated response to/from the user terminal 200 using various communication networks. For example, the input unit 110 and the transmitter 140 may perform communication with the user terminal 200 through various communication networks such as a 2G ($2^{nd}$ Generation) network, a Generation), a 4G ($4^{th}$ Generation) network, a B4G (Beyond 4G) network, a 5G ($5^{th}$ Generation) network, a Wi-Fi network, an IP (Internet Protocol) network, a direction communication network between terminals, etc.

The user terminal 200 may output a response transmitted from the transmitter 140. In this case, the user terminal 200 may display a visual response to a user voice, and may output an auditory response through a speaker.

According to the above-described interactive server 100, when the utterance type of a user voice is vague, a combination response which combines a search response and a chatting response may be provided. Accordingly, a user may be provided with a consistent interactive service.

Figure 5:
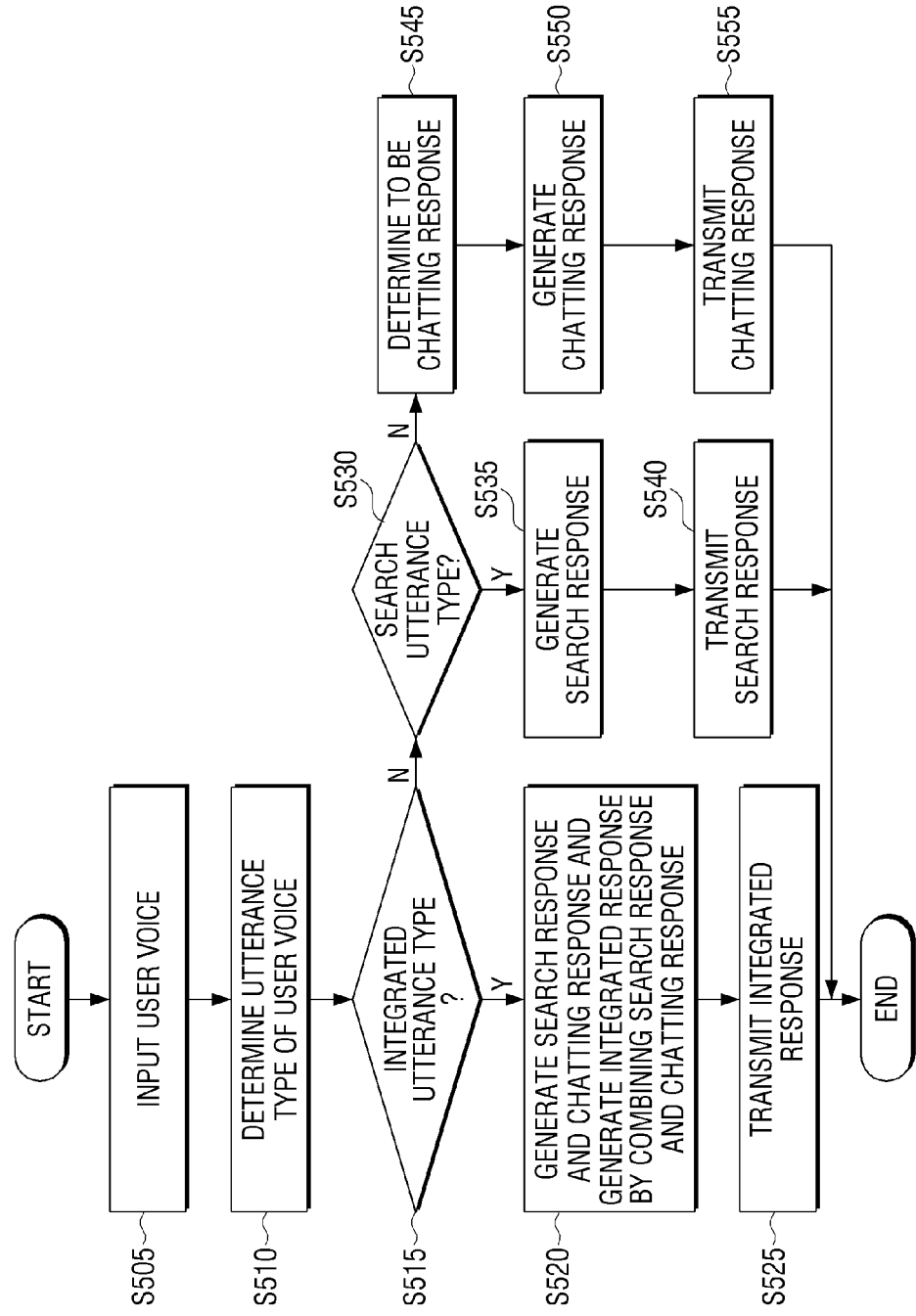
FIG. 5 is a flowchart provided to explain a method for controlling an interactive server according to an exemplary embodiment.

Hereinafter, a method for controlling the interactive server 100 will be described with reference to FIGS. 5 to 7. FIG. 5 is a flowchart provided to explain a method for controlling the interactive server 100 according to an exemplary embodiment.

First, the interactive server 100 receives a user voice (S505) that is input to the user terminal. In this case, the user voice may be in the form of text data, but this is only an example. The user voice may be in the form of voice data. If a user voice is in the form of voice data, the interactive server 100 may generate text data corresponding to the user voice by performing voice recognition.

Subsequently, the interactive server 100 determines the utterance type of a user voice (S510). In this case, the interactive server 100 may determine the utterance type of the user voice using the search language model 150 and the chatting language model 160.

If a user voice is an integrated utterance type (S515-Y), the interactive server 100 generates a search response and a chatting response, and generates an integrated response by combining the search response and the chatting response (S520). Specifically, the interactive server 100 may generate both a search response and a chatting response in response to the user voice, and determine whether the search response and the chatting response can be combined. If it is possible to combine the search response and the chatting response, the interactive server 100 may determine the combination order of the search response and the chatting response, determine whether to modify the search response and the chatting response for combination, and generate an integrated response by combining the modified search response and chatting response according to the determined combination order.

Subsequently, the interactive server 100 transmits the integrated response to the user terminal 200 (S525).

If it is determined that a user voice is not an integrated utterance type (S515-N) and is a search utterance type (S530-Y), the interactive server 100 generates a search response (S535), and transmits the generated search response to the user terminal 200 (S540).

If it is determined that a user voice is not an integrated utterance type (S515-N), and does not belong to a search utterance type, either (S530-N), the interactive server 100 determines that the utterance type of the user voice is a chatting utterance type (S545), generates a chatting response (S550), and transmits the generated chatting response to the user terminal 200 (S555).

Figure 6:
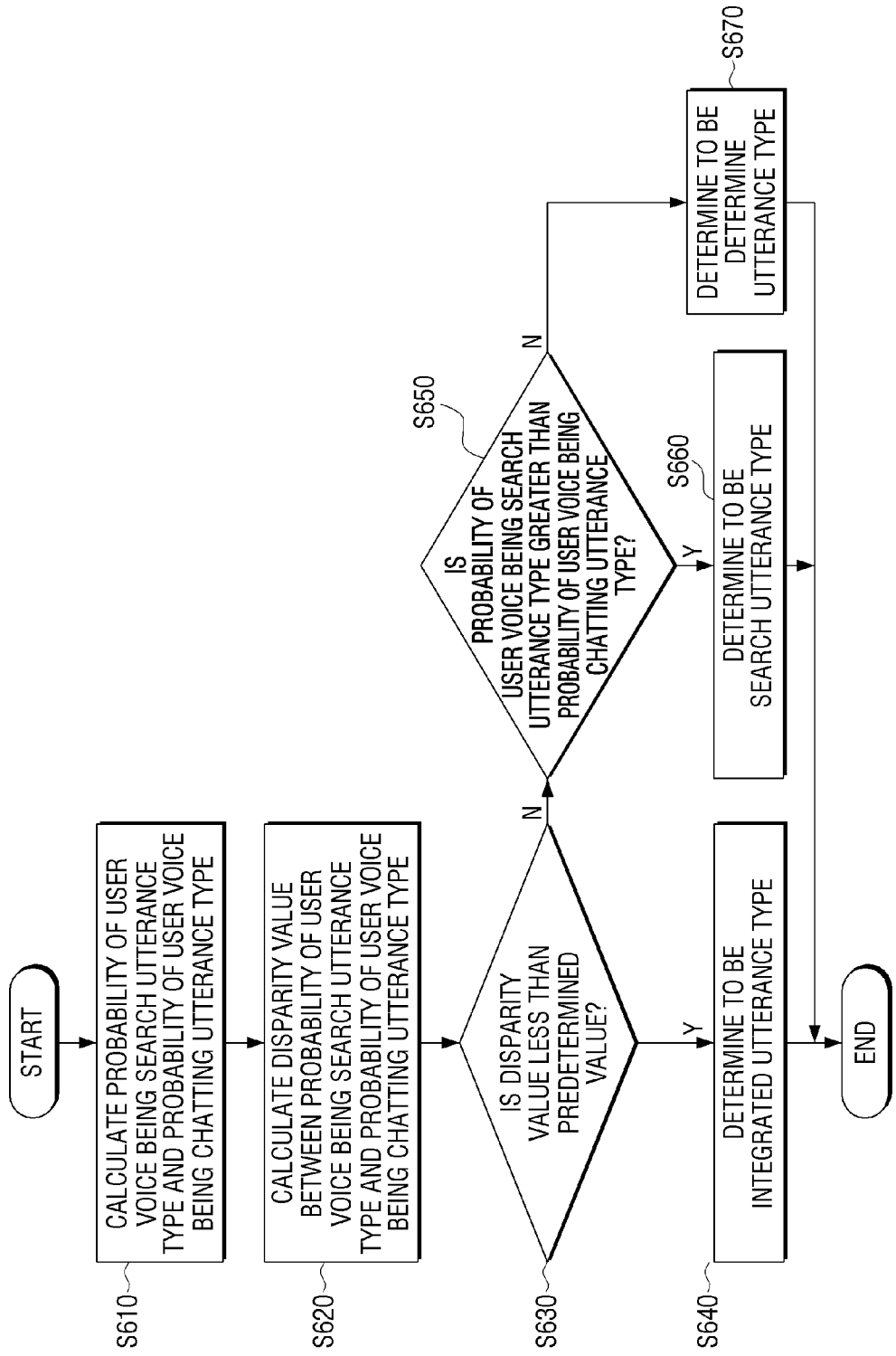
FIG. 6 is a flowchart provided to explain a method for determining an utterance type of a user voice according to an exemplary embodiment.

FIG. 6 is a flowchart provided to explain a method for determining an utterance type of a user voice of the interactive server 100 according to an exemplary embodiment.

First, the interactive server 100 calculates the probability of a user voice being a search utterance type and the probability of a user voice being a chatting utterance type (S610). Specifically, the interactive server 100 may calculate the probability of a user voice being a search utterance type using the search language model 150 established based on search utterances, and calculate the probability of a user voice being a chatting utterance type using the chatting language model 160 established based on chatting utterances.

Subsequently, the interactive server 100 calculates a disparity value between the probability of a user voice being a search utterance type and the probability of the user voice being a chatting utterance type (S620).

The interactive server 100 determines whether the calculated disparity value is less than a predetermined value (S630). In this case, the predetermined value may be set by a system developer, but this is only an example. The predetermined value may be set using a test sentence.

If the disparity value is less than a predetermined value (S630-Y), the interactive server 100 determines that the utterance type of the user voice is an integrated utterance type (S640).

However, if the disparity value exceeds a predetermined value (S630-N), the interactive server 100 determines whether the probability of the user voice being a search utterance type is greater than the probability of the user voice being a chatting utterance type (S650).

If the probability of the user voice being a search utterance type is greater than the probability of the user voice being a chatting utterance type (S650-Y), the interactive server 100 determines that the utterance type of the user voice is a search utterance type (S660). However, if the probability of the user voice being a search utterance type is less than the probability of the user voice being a chatting utterance type (S650-N), the interactive server 100 determines that the utterance type of the user voice is a chatting utterance type (S670).

Figure 7:
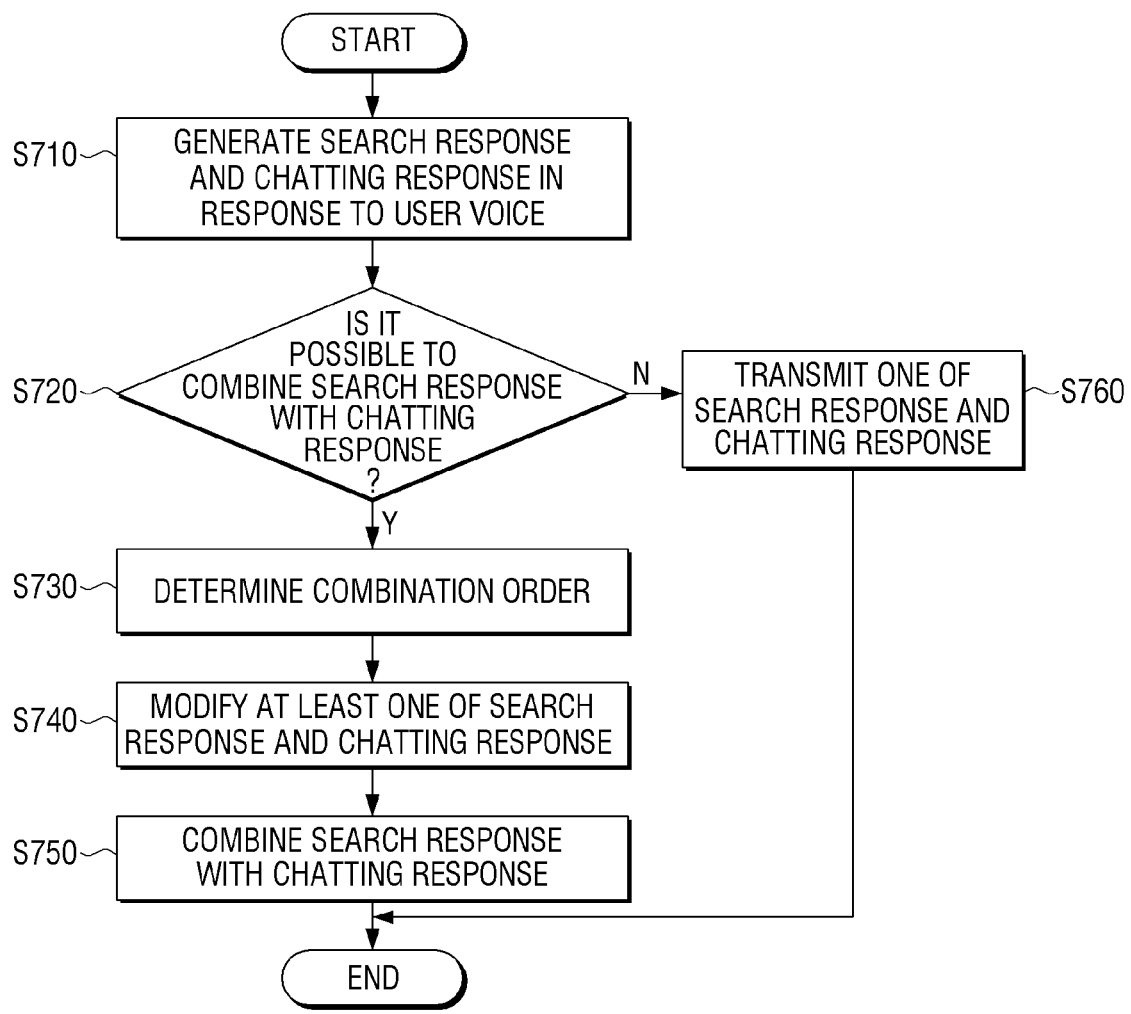
FIG. 7 is a flowchart provided to explain a method for generating an integrated response according to an exemplary embodiment.

FIG. 7 is a flowchart provided to explain a method for generating an integrated response according to an exemplary embodiment.

First, the interactive server 100 generates a search response and a chatting response in response to a user voice (S710).

The interactive server 100 determines whether it is possible to combine the search response and the chatting response (S720). In this case, the interactive server 100 may determine whether it is possible to combine the search response and the chatting response based on the sentence type of the search response and the chatting response and whether common information is included.

If it is possible to combine the search response and the chatting response (S720-Y), the interactive server 100 determines the combination order of the search response and the chatting response (S730). In this case, the interactive server 100 may determine the combination order of a search response and a chatting response by comparing the probability of the user voice being a search utterance type with the probability of the user voice being a chatting utterance type.

The interactive server 100 modifies at least one of a search response and a chatting response (S740). In this case, the interactive server 100 may modify the ending of one of the search response and the chatting response or may put a conjunction between a chatting response and a search response.

Subsequently, the interactive server 100 generates an integrated response by combining the search response and the chatting response (S750).

If it is impossible to combine the search response and the chatting response (S720-N), the interactive server 100 transmits one of the search response and the chatting response to the user terminal 200 (S760). In this case, the interactive server 200 may compare the probability of the user voice being a search utterance with the probability of the user voice being a chatting utterance type, and transmit a response corresponding to the utterance type with greater probability to the user terminal 200.

According to the above-described various exemplary embodiments, if the utterance type of a user voice is vague, an integrated response which combines a search response and a chatting response is provided and thus, a user may be provided with a consistent interactive service.

In FIG. 2 to FIG. 7, the utterance type of a user voice is determined first and then, a response corresponding to the user voice is generated, but this is only an example. The utterance type may be determined after a response corresponding to the user voice is generated, which will be described with reference to FIG. 8 and FIG. 9. However, the features in FIG. 8 and FIG. 9 which are overlapped with those described above will not be described again.

Figure 8:
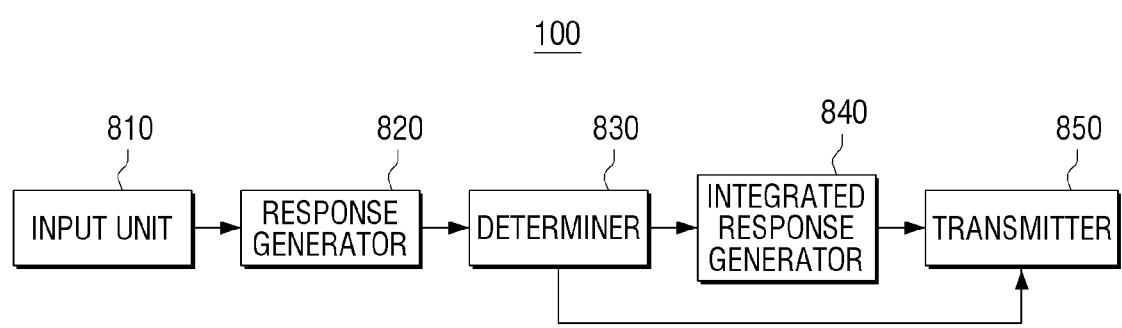
FIG. 8 is a block diagram illustrating configuration of an interactive server according to another exemplary embodiment.

FIG. 8 is a block diagram illustrating configuration of an interactive server 800 according to another exemplary embodiment. As illustrated in FIG. 8, the interactive server 800 includes an input unit 810, a response generator 820, a determiner 830, an integrated response generator 840, and a transmitter 850.

The input unit 810 receives a user voice from the user terminal 200.

The response generator 820 generates both a search response and a chatting response in response to the user voice.

The determiner 830 determines the utterance type of the user voice using the same method described above with reference to FIG. 3. If it is determined that the user voice is a search utterance type, the determiner 830 may output the generated search response to the transmitter 850, and if it is determined that the user voice is a chatting utterance type, the determiner 830 may output the generated chatting response to the transmitter 850. If it is determined that the user voice is an integrated utterance type, the determiner 830 may output the search response and the chatting response to the integrated response generator 840.

The integrated response generator 840 generates an integrated response by combining the search response and the chatting response. Specifically, the integrated response generator 840 may determine whether it is possible to combine the search response and the chatting response. If it is possible to combine the search response and the chatting response, the integrated response generator 840 may determine the combination order of the search response and the chatting response, determine whether to modify the search response and the chatting response for combination, and generate an integrated response by combining the modified search response and chatting response according to the determined combination order. Subsequently, the integrated response generator 840 may output the generated integrated response to the transmitter 850.

The transmitter 850 transmits the output response to the user terminal 200.

Figure 9:
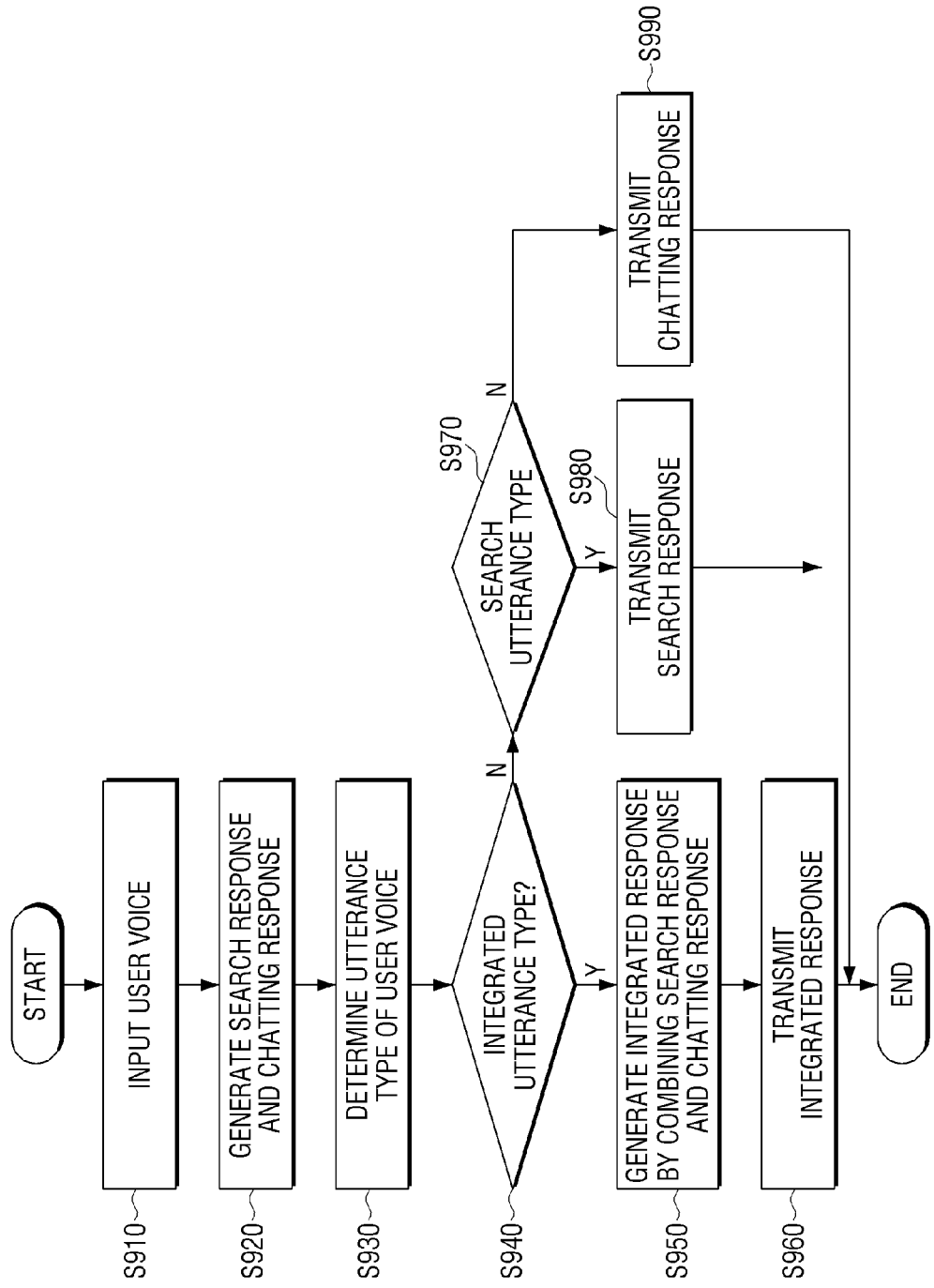
FIG. 9 is a flowchart provided to explain a method for controlling an interactive server according to another exemplary embodiment.

FIG. 9 is a flowchart provided to explain a method for controlling the interactive server 800 according to another exemplary embodiment.

First of all, the interactive server 800 receives a user voice (S910).

The interactive server 800 generates a search response and a chatting response in response to the user voice (S920).

The interactive server 800 determines the utterance type of the user voice (S930). In this case, the interactive server 800 may determine the utterance type of the user voice using the same method as that of FIG. 3 which has been described above.

If it is determined that the user voice is an integrated utterance type (S940-Y), the interactive server 800 generates an integrated response by combining the generated search response and chatting response (S950). The interactive server 800 transmits the generated integrated response to the user terminal 200 (S960).

If it is determined that the user voice does not belong to an integrated utterance type (S940-N) and is a search utterance type (S970-Y), the interactive server 800 transmits the generated search response to the user terminal 200 (S980). If it is determined that the user voice does not belong to an integrated utterance type (S940-N) and is a search utterance type (S970-N), the interactive server 800 determines that the user voice is a chatting utterance type, and transmits the generated chatting response to the user terminal 200 (S990).

According to exemplary embodiments, when the utterance type of a user voice is vague, an integrated response where a search response and a chatting response are combined can be provided and thus, a user may be provided with a consistent interactive service.

A user terminal according to the exemplary embodiments may include a user interface apparatus such as a processor, a memory which stores and executes program data, a permanent storage including a disk drive, a communication port which communicates with an external apparatus, a touch panel, a key, a button, etc. The methods which are realized as a software module or algorithm may be stored in a recording medium which can be readable by a computer as codes or program commands readable by a computer which are executable on a processor. Herein, the recording medium readable by a computer may include a magnetic storage medium (for example, Read-Only Memory (ROM), Random-Access Memory (RAM), floppy disk, hard disk, etc.), an optical reading medium (for example, CD-ROM, Digital Versatile Disc (DVD)), etc. The recording medium readable by a computer may be distributed to computer systems connected through network, and cods readable by a computer may be stored and executed through a distribution method. The medium may be readable by a computer, stored in a memory, and executed by a processor.

The exemplary embodiments may be represented by functional block configurations and various processing steps. Such functional blocks may be realized as hardware and/or software configurations in various numbers which perform specific functions. For example, an exemplary embodiment may employ direct circuit configurations such as memory, processing, logic, look-up table, etc. which can perform various functions through control of one or more microprocessors or other control apparatuses. As the configurations are executed through software programming or software elements, an exemplary embodiment includes various algorithms which are realized as data structure, processes, routines, or combination of other programming configurations, and may be realized in a programming or scripting language such as C, C++, Java, assembler, etc. The functional aspects may be realized by an algorithm which is executed in one or more processors. In addition, an exemplary embodiment may adopt a conventional art for electronic environment setting, signal processing and/or data processing, etc. The terms, "mechanism", "element", "means", and "configuration", may be used broadly, and they are not limited to mechanical and physical elements. The terms may refer to a series of routines of software in connection with a processor, etc.

The specific executions in the exemplary embodiments are provided only as examples and do not limit any technical scope through any methods. For simplicity of the specification, conventional electronic configurations, control systems, software, and other functional aspects of the systems may be omitted. In addition, connection of lines between elements or connection elements which are illustrated in the drawings represent functional connections and/or physical or circuit connections as an example and thus, those connections may be replaced, various function connects may be added, or the connections may be represented as physical connections or circuit connections in the actual apparatus.

In this specification (particularly, in the claims), the term, "the", and other indicative terms which are used in the similar manner may refer to both singular and plural elements. In addition, if a range is recited, the range includes an individual value which belongs to the range (if otherwise recited), and it can be seen that each individual value constituting the range is recited in the detailed description. Lastly, unless there is a clear order regarding the steps of a method, the steps may be performed in an appropriate order, but are not limited thereto. Also, the description of the exemplary embodiments of the present inventive concept is intended to be illustrative, and not to limit the scope of the claims, and many alternatives, modifications, and variations will be apparent to those skilled in the art.

What is claimed is:

1. A method of controlling an interactive server for providing a response according to an utterance type of a user voice, the method comprising:
   receiving, at the interactive server, data corresponding to a user voice from a user terminal;
   calculating a probability of the utterance type of the user voice being a search utterance type using the received data and a search language model established based on search utterances;
   calculating a probability of the utterance type of the user voice being a chatting utterance type using the received data and a chatting language model established based on chatting utterances;
   calculating a disparity value between the probability of the utterance type of the user voice being the search utterance type and the probability of the utterance type of the user voice being the chatting utterance type;
   in response to the disparity value being less than a predetermined value, determining that the utterance type of the user voice is an integrated utterance type;
   in response to the disparity value exceeding the predetermined value and the probability of the utterance type of the user voice being the search utterance type being greater than the probability of the utterance type of the user voice being the chatting utterance type, determining that the user voice is the search utterance type; and
   in response to the disparity value exceeding the predetermined value and the probability of the utterance type of the user voice being the search utterance type being less than the probability of the utterance type of the user voice being the chatting utterance type, determining that the utterance type of the user voice is the chatting utterance type;
   in response to determining that the utterance type of the user voice is the integrated utterance type, generating a search response and a chatting response in response to the user voice and generating an integrated response by modifying at least one from among the search response and the chatting response and combining the search response and the chatting response; and
   transmitting the integrated response to the user terminal.

2. The method as claimed in claim 1, further comprising:
   in response to determining that the utterance type of the user voice is the search utterance type, generating a search response to the user voice, and transmitting the search response to the user terminal; and
   in response to determining that the utterance type of the user voice is the chatting utterance type, generating a chatting response to the user voice, and transmitting the chatting response to the user terminal.

3. The method as claimed in claim 1, wherein the generating the integrated response comprises:
   determining whether it is possible to combine the search response and the chatting response by determining a sentence type of the search response and the chatting response and whether common information is included in the search response and the chatting response;
   in response to determining that it is possible to combine the search response and the chatting response, determining a combination order of the search response and the chatting response,
   wherein the modifying the at least one from among the search response and the chatting response comprises modifying the at least one from among the search response and the chatting response according to the combination order that is determined.

4. The method as claimed in claim 3, further comprising, in response to determining that it is impossible to combine the search response with the chatting response, transmitting one of the search response and the chatting response to the user terminal.

5. The method as claimed in claim 3, wherein the determining the combination order comprises determining the combination order of the search response and the chatting response by comparing a probability of the utterance type of the user voice being the chatting utterance type with a probability of the utterance type of the user voice being the search utterance type.

6. The method as claimed in claim 3, wherein the modifying the at least one from among the search response and the chatting response comprises modifying an ending of the at least one from among the search response and the chatting response.

7. The method as claimed in claim 1, wherein the data corresponding to the user voice is text data.

8. The method as claimed in claim 1, wherein the data corresponding to the user voice is voice data,
   the method further comprising performing voice recognition with respect to the voice data to obtain corresponding text data of the user voice.

9. An interactive server for providing a response according to an utterance type of a user voice, the interactive server comprising:
at least one memory configured to store instructions;
at least one processor configured to execute the stored instructions to implement:
an input interface configured to receive data corresponding to a user voice from a user terminal;
a determiner comprising:
a probability calculator configured to calculate a probability of the utterance type of the user voice being a search utterance type using the received data and a search language model established based on search utterances, and calculate a probability of the utterance type of the user voice being a chatting utterance type using the received data and a chatting language model established based on chatting utterances;
a disparity calculator configured to calculate a disparity value between the probability of the utterance type of the user voice being the search utterance type and the probability of the utterance type of the user voice being the chatting utterance type; and
an utterance type determiner configured to:
in response to the disparity value being less than a predetermined value, determine that the utterance type of the user voice is an integrated utterance type,
in response to the disparity value exceeding the predetermined value and the probability of the utterance type of the user voice being the search utterance type being greater than the probability of the utterance type of the user voice being the chatting utterance type, determine that the utterance type of the user voice is the search utterance type, and
in response to the disparity value exceeding the predetermined value and the probability of the utterance type of the user voice being the search utterance type being less than the probability of the utterance type of the user voice being the chatting utterance type, determine that the utterance type of the user voice is the chatting utterance type;
a response generator configured to, in response to determining that the utterance type of the user voice is the integrated utterance type, generate a search response and a chatting response in response to the user voice, and generate an integrated response by modifying at least one from among the search response and the chatting response and combining the search response and the chatting response; and
a transmitter configured to transmit the integrated response to the user terminal.

10. The interactive server as claimed in claim 9, wherein the response generator is configured to, in response to determining that the utterance type of the user voice is the search utterance type, generate a search response to the user voice, and in response to determining that the utterance type of the user voice is the chatting utterance type, generate a chatting response to the user voice,
wherein the transmitter is configured to transmit one of the search response and the chatting response to the user terminal.

11. The interactive server as claimed in claim 9, wherein the response generator comprises:
a search response generator configured to generate a search response to the user voice;
a chatting response generator configured to generate a chatting response to the user voice;
a combination determiner configured to determine whether it is possible to combine the search response with the chatting response by determining a sentence type of the search response and the chatting response and whether common information is included in the search response and the chatting response;
a combination order determiner configured to, in response to determining that it is possible to combine the search response and the chatting response, determine a combination order of the search response and the chatting response,
wherein the modifying the at least one from among the search response and the chatting response comprises modifying the at least one from among the search response and the chatting response according to the combination order that is determined.

12. The interactive server as claimed in claim 11, wherein the transmitter is configured to, in response to determining that it is impossible to combine the search response with the chatting response, transmit one of the search response and the chatting response to the user terminal.

13. The interactive server as claimed in claim 11, wherein the combination order determiner is configured to determine the combination order of the search response and the chatting response by comparing a probability of the utterance type of the user voice being the chatting utterance type with a probability of the utterance type of the user voice being the search utterance type.

14. The interactive server as claimed in claim 11, wherein the modifying the at least one from among the search response and the chatting response comprises modifying an ending of at least one from among the search response and the chatting response.

15. A method of providing a response according to an utterance type of a user voice, the method comprising:
receiving data corresponding to a user voice from a user terminal;
generating a search response and a chatting response in response to the user voice;
calculating a probability of the utterance type of the user voice being a search utterance type using the received data and a search language model established based on search utterances;
calculating a probability of the utterance type of the user voice being a chatting utterance type using the received data and a chatting language model established based on chatting utterances;
calculating, a disparity value between the calculated probability of the utterance type of the user voice being the search utterance type and the calculated probability of the utterance type of the user voice being the chatting utterance type;
in response to the disparity value being less than a predetermined value, determining that the utterance type of the user voice is an integrated utterance type;
in response to the disparity value exceeding the predetermined value and the probability of the utterance type of the user voice being the search utterance type being greater than the probability of the utterance type of the user voice being the chatting utterance type, determining that the user voice is the search utterance type; and
in response to the disparity value exceeding the predetermined value and the probability of the utterance type of the user voice being the search utterance type being less than the probability of the utterance type of the user voice being the chatting utterance type, determining that the utterance type of the user voice is the chatting utterance type;

in response to determining the utterance type of the user voice is the integrated utterance type, generating an integrated response by modifying at least one from among the search response and the chatting response and combining the search response and the chatting response; and transmitting the integrated response to the user terminal.

16. An interactive server for providing a response according to an utterance type of a user voice, the interactive server comprising:

at least one memory configured to store instructions;

at least one processor configured to execute the stored instructions to implement:

an input interface configured to receive data corresponding to a user voice from a user terminal;

a response generator configured to generate a search response and a chatting response in response to the user voice;

a determiner comprising:

a probability calculator configured to calculate a probability of the utterance type of the user voice being a search utterance type using the received data and a search language model established based on search utterances, and calculate a probability of the utterance type of the user voice being a chatting utterance type using the received data and a chatting language model established based on chatting utterances;

a disparity calculator configured to calculate a disparity value between the probability of the utterance type of the user voice being the search utterance type and the probability of the utterance type of the user voice being the chatting utterance type; and an utterance type determiner configured to:

in response to the disparity value being less than a predetermined value, determine that the utterance type of the user voice is an integrated utterance type, in response to the disparity value exceeding the predetermined value and the probability of the utterance type of the user voice being the search utterance type being greater than the probability of the utterance type of the user voice being the chatting utterance type, determine that the utterance type of the user voice is the search utterance type, and in response to the disparity value exceeding the predetermined value and the probability of the utterance type of the user voice being the search utterance type being less than the probability of the utterance type of the user voice being the chatting utterance type, determine that the utterance type of the user voice is the chatting utterance type;

an integrated response generator configured to, in response to determining that the utterance type of the user voice is the integrated utterance type, generate an integrated response by modifying at least one from among the search response and the chatting response and combining the search response with the chatting response; and a transmitter configured to transmit the integrated response to the user terminal.

* * * * *